US005532344A

United States Patent [19]
Himeno et al.

[11] Patent Number: 5,532,344
[45] Date of Patent: Jul. 2, 1996

[54] PROCESS FOR PRODUCING A MONOAZODYE BY DIAZO-COUPLING OF A P-NITROANALINE DERIVATIVE WITH A N,N-SUBSTITUTED ANALINE DERIVATIVE

[75] Inventors: Kiyoshi Himeno, Munakata; Toshio Hihara; Yoshiharu Hamano, both of Kitakyushu; Shinji Kubo, Nakama, all of Japan

[73] Assignee: Dystar Japan Ltd., Osaka, Japan

[21] Appl. No.: 38,813

[22] Filed: Mar. 29, 1993

[30] Foreign Application Priority Data

Apr. 2, 1992 [JP] Japan .................................. 4-108428
Apr. 16, 1992 [JP] Japan .................................. 4-096823
Apr. 20, 1992 [JP] Japan .................................. 4-099953

[51] Int. Cl.$^6$ .................. C09B 41/00; C09B 29/085; C09B 67/10
[52] U.S. Cl. .................... 534/581; 534/575; 534/887
[58] Field of Search .................. 534/581, 887, 534/575

[56] References Cited

U.S. PATENT DOCUMENTS

| | | | |
|---|---|---|---|
| 2,812,321 | 11/1957 | Eberhart et al. | 534/565 |
| 4,252,718 | 2/1981 | Atherton et al. | 534/582 |
| 4,785,082 | 11/1988 | Weide et al. | 534/581 X |
| 4,795,807 | 1/1989 | Buhler et al. | 534/575 X |
| 4,960,435 | 10/1990 | Tunoda et al. | 534/575 X |
| 5,209,758 | 5/1993 | Traber et al. | 8/526 |

FOREIGN PATENT DOCUMENTS

| | | | |
|---|---|---|---|
| 0363730 | 4/1990 | European Pat. Off. | |
| 0436867 | 7/1991 | European Pat. Off. | |
| 2057480 | 5/1971 | France . | |
| 2290473 | 6/1976 | France . | |
| 3234335 | 3/1984 | Germany | 534/581 |
| 208477 | 5/1984 | Germany . | |
| 59-51280 | 3/1984 | Japan | 534/581 |
| 2193218 | 2/1988 | United Kingdom . | |

OTHER PUBLICATIONS

Chemical Abstracts, vol. 112, No. 20, May 14, 1990, AN 181386e, G. N. Koshel, "Manufacture of Benzanilide Monoazo Pigments".
Chemical Abstracts, vol. 76, No. 18, May 1, 1972, AN 101209z, F. Vyskocil, et al., "Disperse Azo Dyes".
Chemical Abstracts, vol. 107, No. 10, Sep. 1987, AN 79478w, H. W. Modrow, et al., "Color–Stable, Easily Ground C.I. Disperse Orange 30".

Chemical Abstracts, vol. 90, No. 14, Apr. 2, 1979, AN 105628x, V. Vanc, et al., "Stabilized Disperse Yellow 3".
Nippon, Chemical Abstracts, 102:222144 (1985).
English Translation of JP 59–51280, Mar. 24, 1984.
Derwent Abstract of DD 208447, May 2, 1984.
Derwent Abstract of JP 59–51280 Mar. 24, 1984.

*Primary Examiner*—Fiona T. Powers
*Attorney, Agent, or Firm*—Oblon, Spivak, McClelland, Maier & Neustadt

[57] ABSTRACT

A process for producing a monoazodye of the following formula (III):

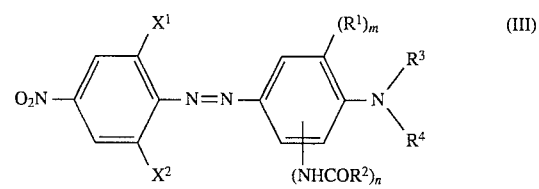

wherein $X^1$ is nitro or halogen, $X^2$ is halogen, $R^1$ is lower alkoxy, $R^2$ is lower alkyl, each of $R^3$ and $R^4$, which are independent of each other, is alkyl, cyanoalkyl or alkylcarbonyloxyalkyl, and each of m and n, which are independent of each other, is 0 or 1, which comprises diazotizing an aniline derivative of the following formula (I):

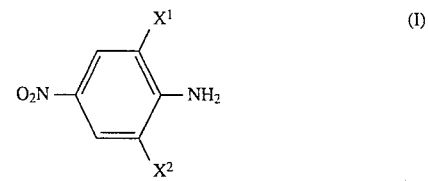

wherein $X^1$ and $X^2$ are as defined above, followed by coupling with an aniline derivative of the following formula (II):

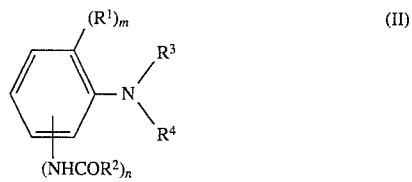

wherein $R^1$, $R^2$, $R^3$, $R^4$, m and n are as defined above, wherein a reaction mixture obtained by the coupling reaction is heat-treated in the presence of a polyoxyethylene higher fatty acid ester type nonionic surfactant, followed by filtration to obtain said monoazo compound in the form of a cake.

15 Claims, No Drawings

PROCESS FOR PRODUCING A MONOAZODYE BY DIAZO-COUPLING OF A P-NITROANALINE DERIVATIVE WITH A N,N-SUBSTITUTED ANALINE DERIVATIVE

The present invention relates to a process for producing a monoazodye. More particularly, it relates to a process for producing a monoazodye, whereby the productivity is improved.

Monoazo compounds of the following structural formulas have long been known as disperse dyes.

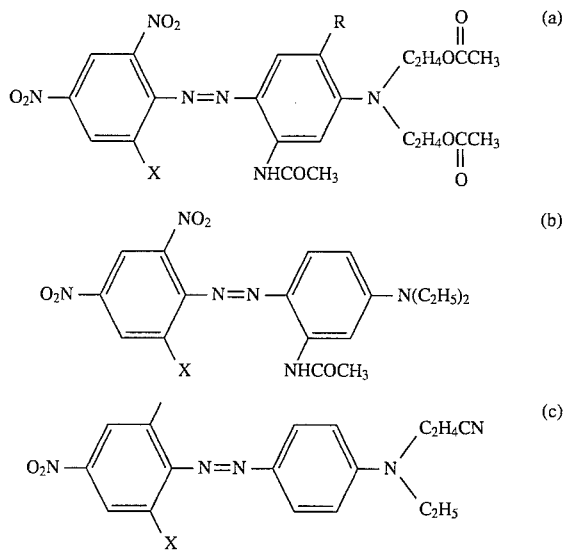

In the above formulas, X is halogen.

These monoazo compounds can be prepared by diazotizing the respective anilines as their diazo components by conventional methods, followed by coupling witch the respective aniline derivatives as their coupling components in an aqueous medium. However, the cakes thereby obtained have a drawback that when they are used as disperse dyes, the dispersibility as dyes and the stability with time are poor.

Therefore, it has been common to employ a method wherein a mixture obtained by the coupling reaction is once subjected to filtration, washed with water and again heat-treated in an aqueous medium at a temperature of from 90° to 95° C. for from 3 to 6 hours. The reason why the heat treatment is conducted after filtration is that if the reaction mixture is subjected directly to heat treatment, the ester groups of the dye tend to be hydrolyzed.

By such heat treatment, the crystalline condition is improved favorably, although no crystal transition of the monoazo compound will take place.

However, the above method has the following problems from the industrial viewpoint.

1. The filtration property of the cake is poor, and the ester groups of the dye tend to undergo hydrolysis during the filtration of the cake. Further, a filtration apparatus with a large filtration capacity is required.
2. Heat treatment of the cake is required to attain good dispersibility of the dye. Before the heat treatment, an filtration operation is required. Thus, two steps are required for the production of the cake, whereby the productivity is very poor.

It is an object of the present invention to solve such problems inherent to the prior art and to provide a process for producing a monoazodye, whereby the productivity is improved.

The present invention provides a process for producing a monoazodye of the following formula (III):

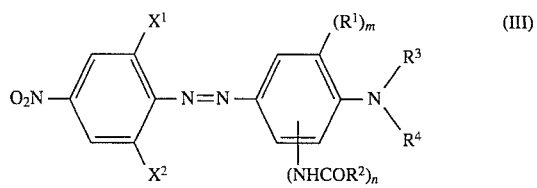

wherein $X^1$ is nitro or halogen, $X^2$ is halogen, $R^1$ is lower alkoxy, $R^2$ is lower alkyl, each of $R^3$ and $R^4$, which are independent of each other, is alkyl, cyanoalkyl or alkylcarbonyloxyalkyl, and each of m and n, which are independent of each other, is 0 or 1, which comprises diazotizing an aniline derivative of the following formula (I):

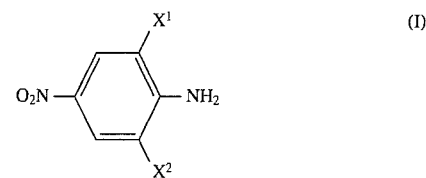

wherein $X^1$ and $X^2$ are as defined above, followed by coupling with an aniline derivative of the following formula (II):

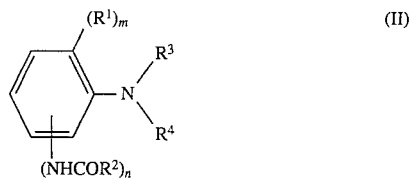

wherein $R^1$, $R^2$, $R^3$, $R^4$, m and n are as defined above, wherein a reaction mixture obtained by the coupling reaction is heat-treated in the presence of a polyoxyethylene higher fatty acid ester type nonionic surfactant, followed by filtration to obtain said monoazo compound in the form of a cake.

Now, the present invention will be described in detail.

The aniline derivative of the formula (I) includes, for example, 2,4-dinitro-6-chloroaniline, 2,4-dinitro-6-bromoaniline, 2,6-dichloro-4-nitroaniline, 2,6-dibromo-4-nitroaniline, 2,6-difluoro-4-nitroaniline, 2,6-diiodo-4-nitroaniline and 2-bromo-6-chloro-4-nitroaniline.

The diazotization reaction is conducted usually by dissolving the aniline derivative of the formula (I) in nitrosyl sulfuric acid at a temperature of from 10° to 40° C., preferably from 20° to 30° C., and stirring the solution for from 3 to 5 hours.

After completion of the diazotization reaction, the diazotized aniline derivative is subjected to the coupling reaction with an aniline derivative of the above formula (II).

In the formula (II), $R^1$ is lower alkoxy such as methoxy or ethoxy. $R^2$ is lower alkyl such as methyl or ethyl, and methyl is preferred Each of $R^3$ and $R^4$, which are independent of each other, is alkyl such as methyl, ethyl, propyl or butyl, preferably lower alkyl, cyanoalkyl such as cyanoethyl or cyanopropyl, preferably cyano lower alkyl, alkylcarbonyloxyalkyl such as methylcarbonyloxyethyl, ethylcarbonyloxyethyl, methylcarbonyloxypropyl or ethylcarbonyloxypropyl, preferably lower alkylcarbonyloxy lower alkyl. Each of m and n, which are independent of each other, is 0 or 1. Here, "lower" means $C_{1-4}$. Among aniline derivatives of the formula (II), particularly preferred are the following compounds.

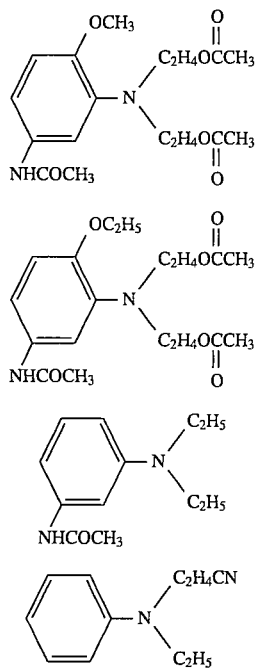

The coupling reaction is conducted usually in an aqueous medium under an acidic condition. For example, the coupling reaction can be conducted by dissolving the compound of the formula (II) in an aqueous medium such as hydrochloric acid, sulfuric acid or acetic acid and mixing thereto the diazotized solution obtained by the above-mentioned diazotization reaction under stirring.

For the coupling reaction, it is preferred to add a small amount of a nitrous acid-removing agent such as sulfamic acid.

The coupling reaction is conducted usually at a temperature of from −10° to +20° C., preferably from −5° to +5° C., and the reaction time is usually from 1 to 10 hours.

By the coupling reaction, a reaction mixture containing crystals of the monoazo compound of the above formula (III), is obtained.

Among monoazo compounds of the formula (III), preferred are the following compounds.

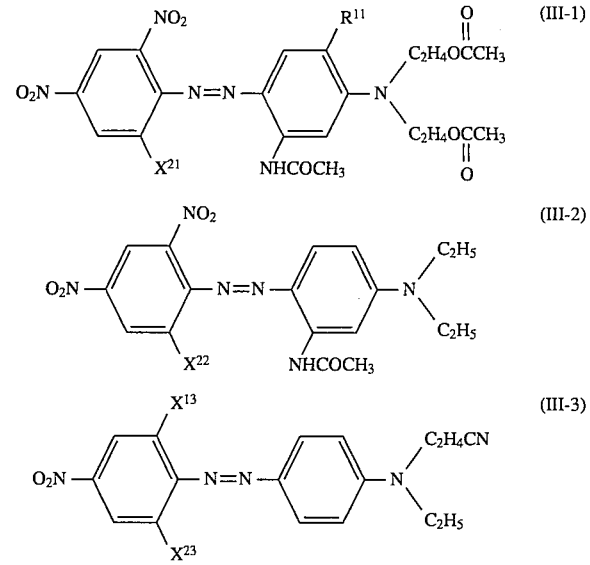

In the above formulas, each of $X^{13}$, $X^{21}$, $X^{22}$ and $X^{23}$ is chlorine or bromine, and $R^{11}$ is methoxy or ethoxy.

In the present invention, the reaction mixture containing crystals of this monoazo compound, is subjected to heat treatment in the presence of the specific surfactant. If a cake is recovered by filtration without conducting the heat treatment, the volume of the cake will be very large, and the filtration property tends to be poor, whereby the compound tends to undergo hydrolysis during the filtration. Further, a powdery dye obtained by finely pulverizing the mixture by a pulverizer such as a sand mill by using an anion dispersant, will be poor in the dispersibility and the stability with time.

The above heat treatment is conducted usually by stirring at a temperature of from 50° to 90° C., preferably from 50° to 70° C., for from 0 5 to 3 hours, preferably from 1 to 2 hours. If the heating temperature is too low, no adequate effect of the heat treatment will be obtained. On the other hand, if the heating temperature is too high, decomposition of the dye tends to take place, such being undesirable. If the heating time is too short, no adequate effect of the heat treatment will be obtained, and if it is too long, such is uneconomical and undesirable.

The feature of the present invention resides in the presence of a polyoxyethylene higher fatty acid ester type nonionic surfactant during the above heat treatment. Namely, by the presence of this surfactant, it will be possible to continuously heat-treat the mixture after completion of the coupling reaction, and it is possible to improve the filtration property of the heat-treated mixture and to reduce the volume of the cake, whereby filtration of the cake can be efficiently conducted. Besides, the obtained compound will have good stability with time as a disperse dye.

The polyoxyethylene higher fatty acid ester type nonionic surfactant to be used in the present invention is usually an ester of a $C_{11-21}$ saturated or unsaturated aliphatic acid with a polyoxyethylene glycol and is represented by the following formula (IV):

$$R\text{—}COO\text{—}(C_2H_4O)_n\text{—}H \qquad (IV)$$

wherein R is a $C_{10-20}$ saturated or unsaturated aliphatic hydrocarbon group, and n is a positive integer.

The higher fatty acid constituting the nonionic surfactant is preferably a $C_{16-19}$ aliphatic acid. Specifically, it may be n-hexadecanoic acid ($C_{15}H_{31}COOH$), n-heptadecanoic acid ($C_{16}H_{33}COOH$), n-octadecanoic acid ($C_{17}H_{35}COOH$), n-nonadecanoic acid ($C_{18}H_{37}COOH$), 9-hexadecenoic acid (($C_{15}H_{29}COOH$), 6-octadecenoic acid ($C_{17}H_{33}COOH$), 9-octadecenoic acid ($C_{17}H_{33}COOH$) or 9,12-octadecadienoic acid ($C_{17}H_{31}COOH$).

On the other hand, the polyoxyethylene glycol is preferably the one having a molecular weight such that the nonionic surfactant formed by esterification will have a HLB (hydrophilic-lipophilic balance) within a range of from 11 to 16, preferably from 12 to 15.

Here, the HLB (hydrophilic-lipophilic balance) is an index showing the molecular weight ratio of the hydrophilic moiety and the lipophilic moiety of the surfactant and is represented by the following formula.

$$HLB=(E+P)/5$$

where E is the weight % of polyoxyethylene in the molecule, and P is the weight % of polyhydric alcohol in the molecule.

The above nonionic surfactant is used usually in an amount of from 1 to 10 wt %, preferably from 2 to 5 wt %, based on the monoazo compound to be produced. If the amount of the nonionic surfactant is too small, no adequate effect for solving the problem will be obtained. On the other hand, if the amount is too large, no additional effect will be obtained, and such is not economical. Therefore, it is advisable that the amount is within the above range.

The nonionic surfactant may be added to the reaction mixture after completion of the coupling reaction. However, if the nonionic surfactant is present during the coupling reaction, the yield of the coupling reaction itself may sometimes be improved in addition to the above-mentioned effects. Therefore, it is particularly preferred that the nonionic surfactant is present even during the coupling reaction.

The reaction mixture after the above heat treatment, is then filtered by a conventional method by means of a filtration machine such as a filter press, a Nutsche funnel or a centrifugal separator, to recover the cake.

In the present invention, the coupling reaction is followed by heat treatment of the reaction mixture in the presence of a polyoxyethylene higher fatty acid ester type nonionic surfactant. By the presence of such a surfactant, heat treatment can be conducted without filtration of the reaction mixture after the coupling reaction, and thus the productivity is good.

Further, foaming during the heat treatment can be minimized, whereby overflow from the reactor can be avoided, and the yield will be improved. Moreover, the water content in the cake can effectively be reduced, and the volume of the cake can be reduced, whereby it will be possible to conduct filtration by a filtration machine having a relatively small filtration capacity.

The reason why such effects are obtainable, is not known. Heretofore, it has been believed that when heat-treated under an acidic condition, an ester type surfactant undergoes hydrolysis and loses its function as a surfactant. From such a conventional belief, the above-mentioned effects are peculiar and surprising.

Further, according to the present invention, the dispersibility as a feature of a disperse dye, will not be impaired. Thus, according to the process of the present invention, a monoazodye having excellent dispersibility can be produced under an improved productivity.

Now, the present invention will be described in further detail with reference to Examples. However, it should be understood that the present invention is by no means restricted by such specific Examples. In the Examples, "parts" means "parts by weight".

EXAMPLES 1 to 6 and COMPARATIVE EXAMPLES 1 to 3

Into a 300 ml glass-lined reactor equipped with a stirrer, 75.6 g of 98% sulfuric acid and 78.8 g of 43% nitrosylsulfuric acid were added, and 68 g of 2,4-dinitro- 6-bromoaniline was added thereto under stirring at a temperature of from 20° to 25° C., whereupon a diazotization reaction was conducted at a temperature of from 20° to 25° C. for 3 hours to obtain a diazotized solution. Into a 4 l cylindrical beaker with a bottom area of 150 cm$^2$, 860 ml of water, 25 g of acetic acid, 93.5 g of N,N-bis(acetoxyethyl)amino-2-methoxy-5-acetanilide, then 0.7 g of sulfamic acid and the nonionic surfactant in an amount as identified in Table 1 were added, and 100 g of ice was added to cool the mixture and obtain a coupling solution. To the coupling solution thus obtained, the diazotized solution obtained by the above diazotization reaction, was dropwise added over a period of one hour at a temperature of from −2° to +2° C. During this period, 370 g of ice was further added. Then, a coupling reaction was conducted for 3 hours while adding 500 g of ice, to obtain a reaction mixture containing a compound of the following formula:

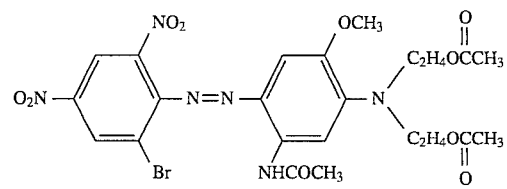

Then, the temperature was raised to the predetermined heat treatment temperature as identified in Table 1 over a period of 2 hours, whereupon heat treatment was conducted at the same temperature for a period of time as identified in Table 1. Immediately thereafter, the mixture was filtered by a Nutsche funnel and washed with water. With respect to a cake thus recovered, the yield and the volume of the cake was measured. The results are shown in Table 1.

TABLE 1

| No | | Nonionic surfactant | HLB | Amount (g) | Temp. (°C.) | Time (hr) | Cake volume (ml/g) | Yield (%) | Filtration speed |
| --- | --- | --- | --- | --- | --- | --- | --- | --- | --- |
| Example | 1 | Polyoxyethylene-9-octadecenoic acid ester | 14 | 4.5 | 60 | 1 | 2.3 | 93.0 | Very quick |
| | 2 | Polyoxyethylene-9-octadecenoic acid ester | 14 | 3.0 | 55 | 1.5 | 2.4 | 92.2 | Very quick |
| | 3 | Polyoxyethylene-9,12-octadecadienoic acid ester | 15 | 4.0 | 60 | 1 | 2.5 | 92.3 | Very quick |
| | 4 | Polyoxyethylene octadecanoic acid ester | 12 | 5 | 60 | 1 | 2.4 | 91.7 | Very quick |
| | 5 | Polyoxyethylene dodecanoic acid ester | 13 | 6.0 | 50 | 2 | 2.8 | 92.0 | Very quick |
| | 6 | Polyoxyethylene-9-octadecenoic acid ester | 12 | 4.0 | 65 | 1 | 2.5 | 92.1 | Very quick |
| Comparative Example | 1 | Nil | | Nil | 60 | 1 | 5.7 | 91.8 | Very slow |
| | 2 | Polyoxyethylene lauryl ether | 14 | 4.5 | 60 | 1 | 3.2 | 85.2 | Quick |
| | 3 | Polyoxyethylene nonylphenyl ether | 14 | 4.5 | 60 | 1 | 3.1 | 81.5* | Quick |

*Substantial foaming observed during the coupling reaction.

TEST EXAMPLES 1 and 2

(Stability with time)

To evaluate the stability with time as a disperse dye, the following test was conducted with respect to each of the cakes obtained in Example 1 and Comparative Example 2.

Water was added to the wet cake (25 g as solid content), 16 g of Reax 85A® (a lignin type dispersing agent, manufactured by Westvaco Company, U.S.A.) and 6 g of Diadisperse® SW (Tamol type dispersing agent, manufactured by Mitsubishi Kasei Corporation) to bring the total amount to 500 g. This mixture was introduced into a 1 l vessel of a six cylinder type grinder (pulverizer) Model 6TSG, manufactured by AIMEX Co., Ltd., and 500 ml of glass beads of from 0.8 to 1.2 mm were added thereto, and the mixture was pulverized at a high speed of 1500 rpm until the average particle size of the dye became at most 1 μm. Then, the dye dispersion and the glass beads were separated by filtration. The dye dispersion was dried by an atomizer, manufactured by NIRO Company to obtain a powder of a disperse dye composition.

Instead of examining the stability with time at room temperature, a part of the powder was sealed in a glass bottle and maintained at 60° C. for 3 days to conduct an accelerated test.

The dispersibility of the powder before and after the accelerated test was evaluated as follows. Into a 150 ml polyethylene beaker, 1 g of the disperse dye composition powder and 99 ml of water were introduced and thoroughly stirred by a stirrer to obtain a uniform dispersion. Then, 100 ml of the disperse dye dispersion was filtered under suction at a reduced pressure of 150 mmHg ($2.0 \times 10^4$ Pa) by a filter paper 5 c (7 cm in diameter) manufactured by Toyo Filter Paper Company, whereby the time (sec) for filtration was examined. The results are shown in Table 2.

TABLE 2

|  | Test Example 1 | Test Example 2 |
| --- | --- | --- |
| Cake producing process | Example 1 | Comparative Example 2 |
| Before the test | 17 sec | 18 sec |
| After the test | 19 sec | 55 sec |

From the above results, it is evident that when a cake was prepared by heat treatment by means of the polyoxyethylene-9-octadecenoic acid ester, the cake had no problem with respect to the stability with time as a disperse dye. On the other hand, when a cake was prepared by heat treatment by means of the polyoxyethylene lauryl ether, the cake had a problem with respect to the stability with time as a disperse dye.

COMPARATIVE EXAMPLE 4

In the method of Comparative Example 1, the reaction mixture after completion of the coupling reaction, was once filtered and washed with water, and the cake thus obtained was put into 1200 ml of water. Then, the temperature was raised to 95° C. over a period of one hour, whereupon heat treatment was conducted at the same temperature for 5 hours. Then, after cooling to 80° C., filtration and washing with water were conducted under the same conditions as in Comparative Example 1 by means of a Nutsche funnel.

As a result, the volume of the cake was 4.7 ml/g, and the yield was 91.7%.

EXAMPLE 7

A monoazo compound cake of the following formula was prepared in the same manner as in Example 1 except that in Example 1, 68 g of 2,4-dinitro-6-bromoaniline was changed to 56.3 g of 2,4-dinitro-6-chloroaniline. In this case, the volume of the cake was 2.5 ml/g, and the yield was 91.9%.

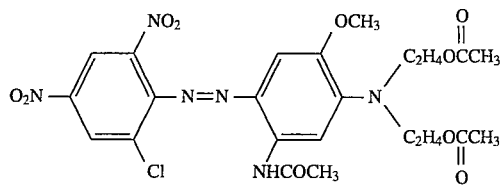

EXAMPLE 8

A cake was prepared in the same manner as in Example 1 except that in Example 1, 4.5 g of polyoxyethylene-9-octadecenoic acid ester (HLB14) as a nonionic surfactant, was added after conducting the coupling reaction instead of adding it prior to the coupling reaction.

In this case, the volume of the cake was 3.5 ml/g, and the yield was 92.3%.

EXAMPLE 9

A monoazo compound cake of the following formula was prepared in the same manner as in Example 1 except that in Example 1, 93.5 g of N,N-bis(acetoxyethyl)amino-2-methoxy-5-acetanilide was changed to 97.2 g of N,N-bis(acetoxyethyl)amino-2-ethoxy-5-acetanilide. In this case, the yield was 91.8%, and the volume of the cake was 2.2 ml/g.

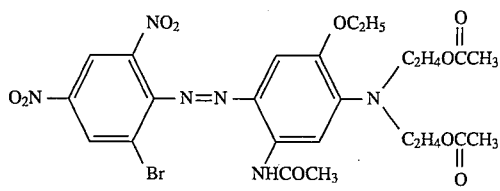

EXAMPLES 10 to 15 and COMPARATIVE EXAMPLES 5 to 7

Into a 200 ml glass-lined reactor equipped with a stirrer, 44.5 g of 98% sulfuric acid and 46.6 g of 43% nitrosyl sulfuric acid were charged, and 40 g of 2,4-dinitro-6-bromoaniline was added thereto under stirring at a temperature of from 20° to 25° C., whereupon a diazotization reaction was conducted at a temperature of from 20° to 25° C. for 3 hours.

Into a 3 l cylindrical beaker with a bottom area of 125 cm², 800 ml of water and 2.5 g of 98% sulfuric acid were charged, and 31.5 g of m-(N,N-dimethylamino)acetanilide was added thereto under stirring at a temperature of at most 10° C.

Then, 0.7 g of sulfamic acid and a predetermined amount of the nonionic surfactant as identified in Table 3 were added thereto. Then, 100 g of ice was added thereto to cool the mixture and obtain a coupling solution. To the coupling solution thus obtained, the diazotized solution obtained by the above diazotization reaction, was dropwise added over a period of one hour at a temperature of from −2 to +2° C. During this period, 250 g of ice was further added. Then, a coupling reaction was conducted for 3 hours, while adding 420 g of ice to obtain a reaction mixture containing a compound of the following formula.

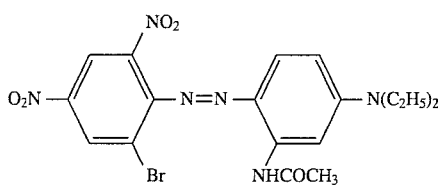

Then, the reaction mixture was heated to the temperature as identified in Table 3 over a period of 2 hours and heat-treated at the same temperature for a period of time as identified in Table 3. Then, the mixture was cooled to 50° C. and then filtered and washed with water by means of a Nutsche funnel. With respect to the cake thus recovered, the yield and the volume of the cake were measured. The results are shown in Table 3.

TABLE 3

| | No | Nonionic surfactant | HLB | Amount (g) | Temp. (°C.) | Time (hr) | Cake volume (ml/g) | Yield (%) | Remarks |
|---|---|---|---|---|---|---|---|---|---|
| Example | 10 | Polyoxyethylene-9-octadecenoic acid ester | 14 | 2.1 | 80 | 1 | 2.3 | 91.0 | |
| | 11 | Polyoxyethylene-9-octadecenoic acid ester | 14 | 1.0 | 60 | 3 | 2.5 | 90.7 | |
| | 12 | Polyoxyethylene-9,12-octadecadienoic acid ester | 15 | 3.0 | 80 | 1 | 2.6 | 90.1 | |
| | 13 | Polyoxyethylene octadecanoic acid ester | 12 | 2.0 | 70 | 2 | 2.5 | 90.2 | |
| | 14 | Polyoxyethylene dodecanoic acid ester | 13 | 3.5 | 80 | 1 | 2.7 | 89.7 | |
| | 15 | Polyoxyethylene-9-octadecenoic acid ester | 12 | 2.1 | 70 | 2 | 2.4 | 90.4 | |
| Comparative Example | 5 | — | | Nil | 80 | 1 | 5.9 | 89.7 | |
| | 6 | Polyoxyethylene lauryl ether | 14 | 2.1 | 80 | 1 | 3.5 | 84.8 | |
| | 7 | Polyoxyethylene nonylphenyl ether | 14 | 2.1 | 80 | 1 | 3.4 | 79.2 | ** |

**Substantial foaming observed during the coupling reaction.

TEST EXAMPLES 3 AND 4

(Stability with time)

To evaluate the stability with time as a disperse dye, evaluation was conducted in the same manner as in Test Examples 1 and 2 with respect to each of the cakes obtained in Example 10 and Comparative Example 6. However, the composition of the wet cake and the dispersing agent was changed such that water was added to the wet cake (18 g as solid content), 24 g of Reax 85A® and 8 g of Diadisperse® SW to bring the total amount to 500 g.

As a result, when the cake obtained in Example 10 was used as a disperse dye, no deterioration was observed in the dispersibility even after the accelerated test (Test Example 3). On the other hand, when the cake obtained in Comparative Example 6 was used as a disperse dye, deterioration was observed in the stability with time (Test Example 4).

COMPARATIVE EXAMPLE 8

In the method of Comparative Example 5, the reaction mixture after completion of the coupling reaction, was once filtered and washed with water, and the cake thus obtained was put into 1200 ml of water. Then, the temperature was raised to 95° C. over a period of one hour, whereupon heat treatment was conducted at the same temperature for 5 hours. Then, after cooling to 80° C., filtration and washing with water were conducted under the same conditions as in Comparative Example 5 by means of a Nutsche funnel.

As a result, the volume of the cake was 4.9 ml/g, and the yield was 89.6%.

EXAMPLE 16

A monoazo compound cake of the following formula was prepared in the same manner as in Example 10 except that in Example 10, 40 g of 2,4-dinitro-6-bromoaniline was changed to 33.2 g of 2,4-dinitro-6-chloroaniline. In this case, the volume of the cake was 2.4 ml/g, and the yield was 90.1%.

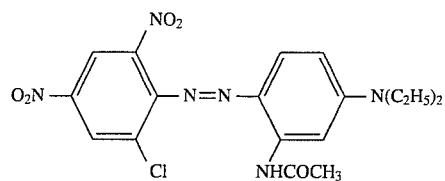

EXAMPLE 17

A cake was prepared in the same manner as in Example 10 except that in Example 10, 2.1 g of the polyoxyethylene-9-octadecenoic acid ester (HLB14) as a nonionic surfactant, was added after conducting the coupling reaction instead of adding it prior to the coupling reaction.

In this case, the volume of the cake was 3.5 ml/g, and the yield was 89.6%.

EXAMPLES 18 to 23 AND COMPARATIVE EXAMPLES 9 TO 11

Into a 300 ml glass-lined reactor equipped with a stirrer, 46 g of 98% sulfuric acid and 60.8 g of 43% nitrosylsulfuric acid were charged, and 41.4 g of 2,6-dichloro-4-nitroaniline was added thereto under stirring at a temperature of from 20° to 35° C., whereupon a diazotization reaction was conducted at a temperature of from 30° to 35° C. for 3 hours to obtain a diazotized solution.

On the other hand, into a 2 l cylindrical beaker with a bottom area of 125 cm², 575 ml of water, 31.6 g of 98% sulfuric acid were charged, and 48.4 g of N-ethyl-N-(2-cyanoethyl)aniline was added thereto at a temperature of at most 30° C. Then, 1.6 g of sulfamic acid and a nonionic surfactant as identified in Table 4 in an amount as identified in Table 4 were added thereto, and 442 g of ice was added to cool the mixture and obtain a coupling solution. To the coupling solution thus obtained, the diazotized solution obtained by the above diazotization reaction, was dropwise added over a period of one hour at a temperature of from −5° to +5° C. Then, a coupling reaction was conducted at the same temperature for one hour to obtain a reaction mixture containing as the main component a monoazo compound of the following formula:

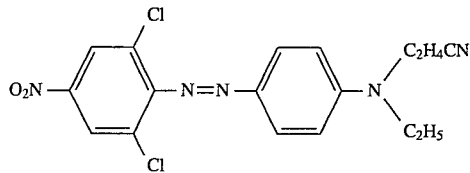

The reaction mixture was heated to a predetermined temperature as identified in Table 4 over a period of one hour and then heat-treated at that temperature for 2 hours. Then, the mixture was cooled to 40° C. and then filtered by means of a Nutsche funnel and washed with water. With respect to a cake recovered by the filtration, the yield and the volume of the cake were measured. Further, the foaming state during the heat treatment was observed. The results are shown in Table 4.

tive Example 10 was used as a disperse dye, deterioration was observed in the stability with time (Test Example 6).

EXAMPLE 24

A monoazo compound cake of the following formula was prepared in the same manner as in Example 18 except that in Example 18, 59.2 g of 2,6-dibromo-4-nitroaniline was used instead of 41.4 g 2,6-dichloro-4-nitroaniline, and the amount of polyoxyethylene-9-octadecenoic acid ester was changed to 3 g.

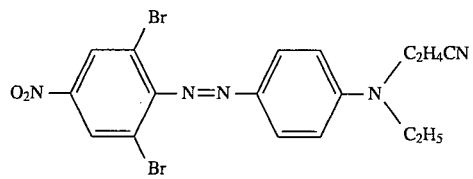

As a result, foaming was very little, the volume of the cake was 1.95 ml/g, and the yield was 97.8%.

EXAMPLE 25

An azo compound cake was prepared in the same manner as in Example 18 except that in Example 18, 2.2 g of polyoxyethylene-9-octadecenoic acid ester (HLB14) as a nonionic surfactant, was added after the coupling reaction instead of adding it prior to the coupling reaction, and foaming, the volume of the cake and the yield were evaluated in the same manner. As a result, foaming was little, the volume of the cake was 2.20 ml/g and the yield was 96.2%.

We claim:

1. A process for producing a monoazo dye of the following formula (III):

TABLE 4

|  | Nonionic surfactant | HLB | Amount (g) | Temp. (°C.) | Time (hr) | Foaming | Cake volume (ml/g) | Yield (%) |
| --- | --- | --- | --- | --- | --- | --- | --- | --- |
| Example 18 | Polyoxyethylene-9-octadecenoic acid ester | 14 | 2.2 | 80 | 2 | Very little | 1.88 | 98.1 |
| Example 19 | Polyoxyethylene-9-octadecenoic acid ester | 14 | 1.1 | 80 | 2 | Little | 1.93 | 98.0 |
| Example 20 | Polyoxyethylene dodecanoic acid ester | 13 | 3.5 | 60 | 1 | Moderate | 2.10 | 96.3 |
| Example 21 | Polyoxyethylene octadecanoic acid ester | 12 | 2.0 | 70 | 2 | Little | 1.92 | 96.5 |
| Example 22 | Polyoxyethylene-9,12-octadecadienoic acid ster | 15 | 3.0 | 80 | 2 | Little | 1.89 | 97.1 |
| Example 23 | Polyoxyethylene-9-octadecenoic acid ester | 12 | 2.0 | 80 | 2 | Little | 1.97 | 97.8 |
| Comparative Example 9 | — |  | — | 80 | 2 | Very high | 3.22 | 96.1 |
| Comparative Example 10 | Polyoxyethylene lauryl ether | 14 | 2.2 | 80 | 2 | High | 2.02 | 90.9 |
| Comparative Example 11 | Polyoxyethylene nonylphenyl ether | 14 | 2.2 | 80 | 2 | Moderate | 2.36 | 80.2 |

TEST EXAMPLES 5 and 6

(Stability with time)

To evaluate the stability with time as a disperse dye, a test was conducted in the same manner as in Test Examples 1 and 2 with respect to each of the cakes obtained in Example 18 and Comparative Example 10.

As a result, when the cake obtained in Example 18 was used as a disperse dye, no deterioration was observed in the dispersibility even after the accelerated test (Test Example 5). On the other hand, when the cake obtained in Comparaing formula (III):

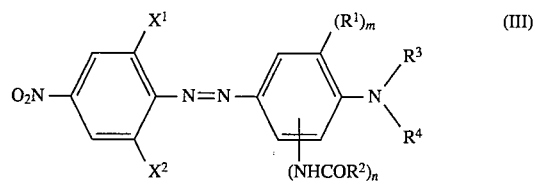

wherein $X^1$ is nitro or halogen, $X^2$ is halogen, $R^1$ is lower alkoxy, $R^2$ is lower alkyl, each of $R^3$ and $R^4$, which are independent of each other, is alkyl, cyanoalkyl or alkylcarbonyloxyalkyl, and each of m and n, which are independent of each other, is 0 or 1, which comprises diazotizing an aniline derivative of the following formula (I):

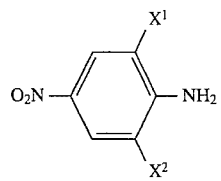

wherein $X^1$ and $X^2$ are as defined above, followed by coupling, in an aqueous medium under acidic conditions and in the presence of a polyoxyethylene higher fatty acid ester nonionic surfactant, with an aniline derivative of the following formula (II):

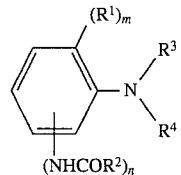

wherein $R^1$, $R^2$, $R^3$, $R^4$, m and n are as defined above, wherein a reaction mixture obtained by the coupling reaction is heat-treated in the presence of said polyoxyethylene higher fatty acid ester nonionic surfactant, followed by filtration to obtain said monoazodye in the form of a cake, and wherein the nonionic surfactant is of the formula:

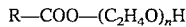

where R is a $C_{10}$–$C_{20}$ saturated or unsaturated aliphatic hydrocarbon group and n is a positive integer.

2. The process according to claim 1, wherein $X^1$ is nitro, $X^2$ is chlorine or bromine, $R^1$ is methoxy or ethoxy, $R^2$ is methyl, each of $R^3$ and $R^4$ is

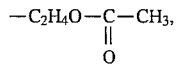

and each of m and n is 1.

3. The process according to claim 1, wherein $X^1$ is nitro, $X^2$ is chlorine or bromine, $R^2$ is methyl each of $R^3$ and $R^4$ is $C_{1-4}$ lower alkyl, m is 0, and n is 1.

4. The process according to claim 3, wherein each of $R^3$ and $R^4$ is ethyl.

5. The process according to claim 1, wherein each of $X^1$ and $X^2$ is halogen, $R^3$ is cyanoalkyl, $R^4$ is alkyl and each of m and n is 0.

6. The process according to claim 5, wherein $R^3$ is cyanoethyl, and $R^4$ is ethyl.

7. The process according to claim 1, wherein R is a $C_{16}$–$C_{19}$ saturated or unsaturated aliphatic hydrocarbon group.

8. The process according to claim 1, wherein the polyoxyethylene higher fatty acid ester type nonionic surfactant has a HLB of from 11 to 16.

9. The process according to claim 8, wherein the nonionic surfactant has a HLB of from 12 to 15.

10. The process according to claim 1, wherein the nonionic surfactant is used in an amount of from 1 to 10 wt %, based on the monoazo compound to be produced.

11. The process according to claim 10, wherein the nonionic surfactant is used in an amount of from 2 to 5 wt %, based on the monoazo compound to be produced.

12. The process according to claim 1, wherein the heat treatment after the coupling reaction is conducted by stirring at a temperature of from 50° to 90° C. for from 0.5 to 3 hours.

13. The process according to claim 1, wherein the coupling reaction is conducted at a temperature of from −10° to +20° C.

14. The process according to claim 1, wherein said nonionic surfactant is selected from the group consisting of polyoxyethylene n-hexadecanoic acid ester, polyoxyethylene n-heptadecanoic acid ester, polyoxyethylene n-octadecanoic acid ester, polyoxyethylene n-nonadecanoic acid ester, polyoxyethylene-9-hexadecenoic acid ester, polyoxyethylene-6-octadecenoic acid ester, polyoxyethylene-9-octadecenoic acid ester, polyoxyethylene-9,12-octadecadienoic acid ester and polyoxyethylene dodecanoic acid ester.

15. The process according to claim 1, wherein said coupling reaction conducted under acidic conditions is conducted in the presence of sulfuric acid.

* * * * *